US008213274B2

(12) United States Patent
Takeda (10) Patent No.: US 8,213,274 B2
(45) Date of Patent: Jul. 3, 2012

(54) OPTICAL DISC REPRODUCING METHOD

(75) Inventor: Yuta Takeda, Maebashi (JP)

(73) Assignee: JVC KENWOOD Corporation, Yokohama-shi (JP)

(*) Notice: Subject to any disclaimer, the term of this patent is extended or adjusted under 35 U.S.C. 154(b) by 114 days.

(21) Appl. No.: 12/820,567

(22) Filed: Jun. 22, 2010

(65) Prior Publication Data

US 2010/0329086 A1    Dec. 30, 2010

(30) Foreign Application Priority Data

Jun. 29, 2009   (JP) ................................ 2009-153535

(51) Int. Cl.
*G11B 7/085* (2006.01)
(52) U.S. Cl. ................ 369/30.13; 369/30.1; 369/47.38; 369/47.4
(58) Field of Classification Search ............... 369/30.03, 369/30.1, 30.13, 47.38, 47.4
See application file for complete search history.

(56) References Cited

U.S. PATENT DOCUMENTS 5,471,441 A * 11/1995 Nonaka et al. ............. 369/30.11
6,680,880 B1 * 1/2004 Ripoll-Ensenat et al. . 369/30.16

FOREIGN PATENT DOCUMENTS

| JP | 2000-048378 A | 2/2000 |
| JP | 2000048378 A * | 2/2000 |
| JP | 2000-331353 A | 11/2000 |
| JP | 2000331353 A * | 11/2000 |
| JP | 2005-149646 A | 6/2005 |
| JP | 2007-323753 A | 12/2007 |

* cited by examiner

*Primary Examiner* — Wayne Young
*Assistant Examiner* — Brenda Bernardi
(74) *Attorney, Agent, or Firm* — Marvin A. Motsenbocker; Mots Law, PLLC (57) ABSTRACT

There is provided an optical disc reproducing method capable of reproducing a non-finalized DVD+R. When a seek operation is performed from a present address on the non-finalized DVD+R to an outer circumferential side target address, the outer circumferential direction total jump number of tracks is calculated from a difference between the present address and the target address. When a first condition is satisfied in which the present address is in an inner circumferential zone, the target address is in a second outer circumferential zone, and the outer circumferential direction total jump number is 701 to 2500, the jump number of tracks is set to 340 smaller than the outer circumferential direction total jump number, and a traverse seek using a moving mechanism to move an optical pickup in a radius direction by 340 is performed.

9 Claims, 6 Drawing Sheets

FIG.2

| SESSION | ZONE | DESCRIPTION | NUMBER OF PHYSICAL SECTORS |
|---|---|---|---|
| | INNER DRIVE AREA | | |
| SESSION 1 | LEAD-IN | ... | ... |
| | | INNER DISC IDENTIFICATION ZONE | 64 |
| | | SESSION CONTROL DATA ZONE | 256 |
| | | ... | ... |
| | | CONTROL DATA ZONE | 3072 |
| | | BUFFER ZONE 2 | 513 |
| | DATA | DATA ZONE | min 16 |
| | CLOSURE | BUFFER ZONE C | 768 |
| | | OUTER SESSION IDENTIFICATION ZONE | 256 |
| SESSION n (2 ≦ n ≦ N) | INTRO | BUFFER ZONE A | 64 |
| | | INNER DISC IDENTIFICATION ZONE | 256 |
| | | SESSION CONTROL DATA ZONE | 640 |
| | | BUFFER ZONE B | 64 |
| | DATA | DATA ZONE | min 16 |
| | CLOSURE | BUFFER ZONE C | 768 |
| | | OUTER SESSION IDENTIFICATION ZONE | 256 |
| ... | ... | ... | ... |
| SESSION N (N ≦ 191) | INTRO | ... | ... |
| | DATA | DATA ZONE | min 16 |
| | LEAD-OUT | BUFFER ZONE 3 | 768 |
| | | OUTER SESSION IDENTIFICATION ZONE | 256 |
| | | ... | ... |
| | OUTER DRIVE AREA | ... | |

OPTICAL DISC REPRODUCING METHOD

CROSS-REFERENCE TO RELATED APPLICATIONS

The present application claims priority based on 35 USC 119 from prior Japanese Patent Application No. P 2009-153535 filed on Jun. 29, 2009, the entire contents of which are incorporated herein by reference.

BACKGROUND OF THE INVENTION

1. Field of the Invention

The present invention relates to an optical disc reproducing method capable of reproducing a non-finalized optical disc, and particularly to an optical disc reproducing method capable of reproducing a non-finalized DVD+R standard optical disc (hereinafter referred to as a non-finalized DVD+R).

2. Description of the Related Art

In addition to optical discs based on various DVD standards defined by the DVD Forum, there is an optical disc based on the DVD+R standard defined by the DVD+RW alliance. In the Live File System of Windows Vista (Windows is the registered trademark of Microsoft Corporation) which is Microsoft Corporation's operating system for personal computer, it is default to use UDF (Universal Disc Format) 2.01. When data such as video or audio content is recorded on a DVD+R standard optical disc in the Live File System of Windows Vista, the optical disc is not finalized, but becomes a non-finalized DVD+R.

Data is recorded on a DVD+R standard optical disc in a multi-session data structure. When the non-finalized DVD+R on which one or plural sessions are recorded is reproduced, it is necessary to read data called ICB (Information Control Block) in a closure positioned at the outermost circumference of the recorded area. A VAT (Virtual Allocation Table) based on the UDF is recorded in the recorded area. Since the ICB includes information indicating where the VAT is recorded, the VAT can be read by reading the ICB. When the VAT is read, the session structure can be known, and the optical disc reproducing apparatus can obtain information necessary for reproducing the non-finalized DVD+R.

As related arts, Japanese Unexamined Patent Publication 2005-149646 and Japanese Unexamined Patent Publication 2007-323753 are known.

In the DVD+R standard optical disc, the number of sectors (the number of tracks) assigned as the closure is small. Thus, when an optical pickup moves from an inner circumferential side of the optical disc to an outer circumferential side to read the ICB in the closure in order to reproduce the non-finalized DVD+R, there occurs a case where the optical pickup moves onto a non-recorded area positioned outside the closure. In this case, there occurs an out-of-focus state in which the laser beam is out of focus on the non-recorded area.

As stated above, in the related art optical disc reproducing apparatus, when the non-finalized DVD+R is reproduced, it is difficult to accurately position the optical pickup in the closure having a small number of tracks, and there is a problem that the non-finalized DVD+R can not be reproduced. This problem arises notably in, for example, an in-vehicle reproduction-only optical disc reproducing apparatus. As stated above, when data is recorded on the DVD+R standard optical disc in the Live File System of Windows Vista, the non-finalized DVD+R is produced, and therefore, it is desired to enable the non-finalized DVD+R to be reproduced.

SUMMARY OF THE INVENTION

The present invention has been made in view of such problems, and an object thereof is to provide an optical disc reproducing method capable of reproducing a non-finalized DVD+R. It is another object of the invention to provide an optical disc reproducing method capable of reproducing a non-finalized DVD+R by a simple method, not by such a complicated structure as to increase the cost.

In order to solve the problems of the related art, according to an aspect of the invention, an optical disc reproducing method includes calculating an outer circumferential direction total jump number of tracks from a difference between a present address and a target address when a seek operation is performed from the present address on a non-finalized DVD+R standard optical disc to the target address positioned on an outer circumferential side of the present address, determining whether the present address is in a first outer circumferential zone of a first number of tracks from a closure positioned at an outermost circumference of a recorded area of the optical disc or whether the present address is in an inner circumferential zone on an inner circumferential side of the first outer circumferential zone, determining whether the target address is in a second outer circumferential zone of a second number of tracks from the closure, setting a jump number of tracks to a third number smaller than the outer circumferential direction total jump number when a first condition is satisfied in which the present address is in the inner circumferential zone, the target address is in the second outer circumferential zone, and the outer circumferential direction total jump number is between a first number and a second number larger than the first number, and performing a traverse seek using a moving mechanism to move an optical pickup in a radius direction by the third number.

When a second condition is satisfied in which the present address is in the inner circumferential zone, the target address is in the second outer circumferential zone, and the outer circumferential direction total jump number is smaller than the first number, it is desirable that the jump number of tracks is set to a fourth number smaller than the third number, and a multi jump is performed in which an irradiation position of a laser beam from the optical pickup is moved in the radius direction by the fourth number in a state where a position of the optical pickup determined by the moving mechanism is fixed.

When the first and the second conditions are not satisfied, but a third condition is satisfied in which the present address is in the first outer circumferential zone, and the outer circumferential direction total jump number is not smaller than a fifth number larger than the fourth number, it is desirable that the jump number of tracks is set to a sixth number smaller than the fifth number, and the multi jump is performed by the sixth number.

When the first and the second conditions are not satisfied, but a fourth condition is satisfied in which the present address is in the first outer circumferential zone, and the outer circumferential direction total jump number is between a seventh number smaller than the fifth number and an eighth number smaller than the fifth number and larger than the seventh number, it is desirable that the jump number of tracks is set to a ninth number smaller than the seventh number, and the multi jump is performed by the ninth number.

When a fifth condition is satisfied in which the present address is not in the first outer circumferential zone or the target address is not in the second outer circumferential zone, it is desirable that the traverse seek, the multi jump and an interval jump in which the position of the optical pickup determined by the moving mechanism is fixed, and the irradiation position of the laser beam from the optical pickup is moved one track by one track are selectively performed according to the outer circumferential direction total jump number.

In the above optical disc reproducing method, it is characterized in that the first number of tracks of the first outer circumferential zone and the second number of tracks of the second outer circumferential zone are equal to each other, or the second number of tracks is smaller than the first number of tracks. However, it is desirable that the second number of tracks is smaller than the first number of tracks.

Further, when the seek operation is performed from the present address on the optical disc to the target address positioned on the inner circumferential side of the present address, an inner circumferential direction total jump number of tracks is calculated from a difference between the present address and the target address, it is determined whether the present address is in the second outer circumferential zone, and when a sixth condition is satisfied in which the present address is in the second outer circumferential zone and the inner circumferential direction total jump number is a tenth number or more, it is desirable to perform the traverse seek in a state where focus detection and defect detection are turned off.

When a seventh condition is satisfied in which the present address is in the second outer circumferential zone, and the inner circumferential direction jump number is between an eleventh number smaller than the tenth number and a twelfth number smaller than the tenth number and larger than the eleventh number, it is desirable that the jump number is set to a thirteenth number smaller than the eleventh number, and the multi jump is performed by the thirteenth number.

When an eighth condition is satisfied in which the present address is not in the second outer circumferential zone, it is desirable that the traverse seek, the multi jump and the interval jump are selectively performed according to the inner circumferential direction total jump number.

According to the optical disc reproducing method of the invention, the non-finalized DVD+R can be reproduced. Besides, the method is simple in which the jump number of the optical pickup is suitably set, and the traverse seek, the multi jump and the interval jump are selectively used. Accordingly, the cost is hardly increased, and the non-finalized DVD+R can be reproduced.

DETAILED DESCRIPTION OF THE INVENTION

Figure 1:
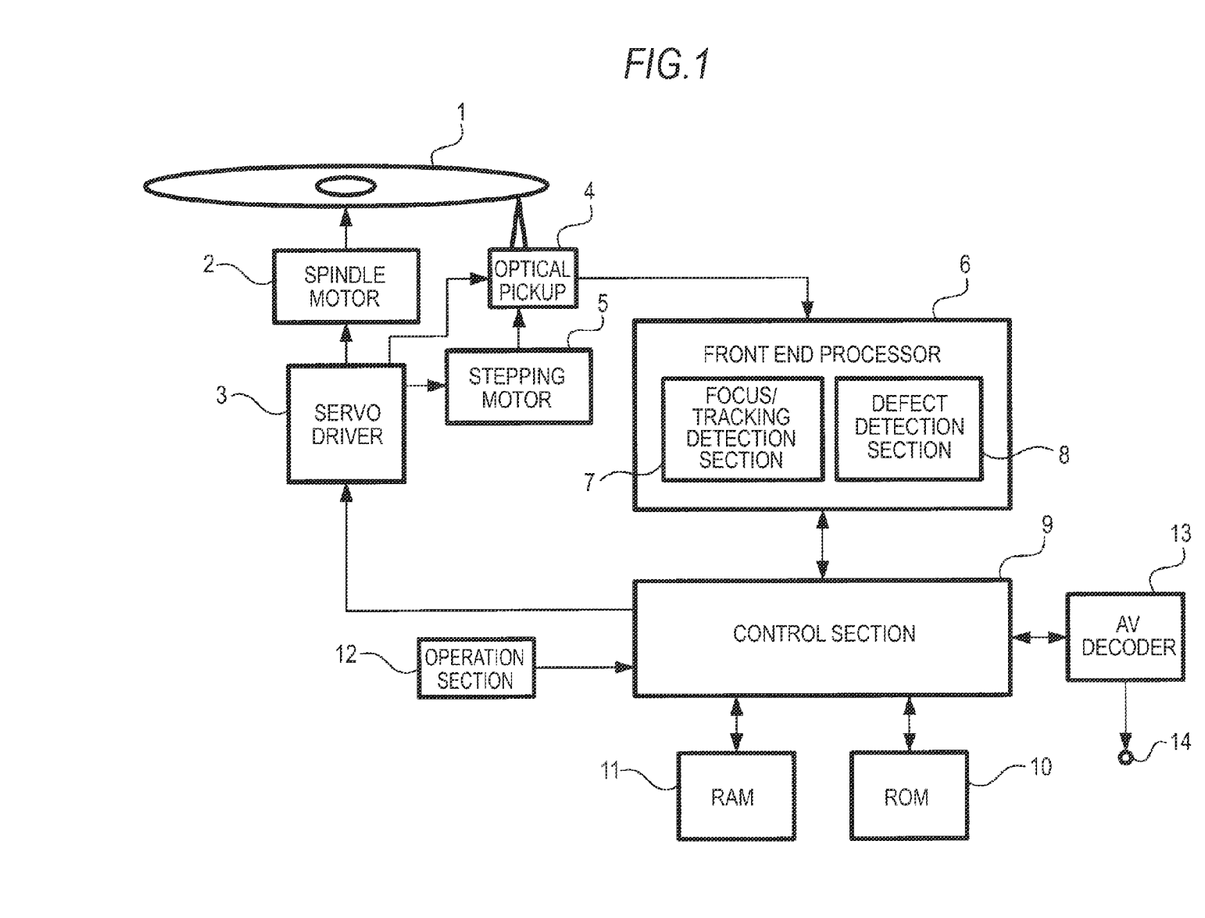
FIG. 1 is a block diagram showing an example of a structure of an optical disc reproducing apparatus to execute an optical disc reproducing method of the invention.

An optical disc reproducing method of the present invention will be described with reference to the accompanying drawings. In FIG. 1, an optical disc 1 as a non-finalized DVD+R is rotated by a spindle motor 2. The spindle motor 2 rotates the optical disc 1 at a specified rotation speed by control of a servo driver 3. An optical pickup 4 includes a laser light source and an objective lens. The objective lens focuses and irradiates a laser beam emitted from the laser light source to an information recording surface of the optical disc 1. Although not shown, there is provided a guide mechanism, such as a rail, capable of moving the optical pickup 4 in a radius direction of the optical disc 1. A stepping motor 5 moves the optical pickup 4 along the guide mechanism in the radius direction by the control of the servo driver 3. The guide mechanism and the stepping motor 5 are a moving mechanism to move the optical pickup 4 in the radius direction.

By the moving mechanism, an irradiation position of the laser beam emitted from the optical pickup 4 on the information recording surface can be moved in the radius direction. A seek operation in which the optical pickup 4 is moved by the guide mechanism and the stepping motor 5 in the radius direction is called a traverse seek. As described later, the traverse seek is used when the jump number of tracks as a difference between a present address and a target address is large.

Besides, in a state where the position of the optical pickup 4 in the radius direction determined by the moving mechanism is fixed, that is, in a state where the traverse seek is not performed, tracks to which the laser beam is irradiated can be changed in a specified range in the radius direction by moving the objective lens in the optical pickup 4 by the control of the servo driver 3 and by an actuator. A seek operation in which the irradiation position of the laser beam is moved by a plurality of tracks in the state where the position of the optical pickup 4 in the radius direction is fixed is called a multi jump. Further, the irradiation position of the laser beam can be moved in units of one track in the state where the position of the optical pickup 4 in the radius direction is fixed, and this seek operation is called an interval jump.

As described later, the multi jump is used when the irradiation position of the laser beam is moved by a plurality of tracks, the jump number of which is smaller than the jump number in the traverse seek. The interval jump is used when the irradiation position is made to reach the target address gradually in units of one track from the state where it is close to the target address.

As stated above, the radius direction position adjustment of the laser beam irradiated from the optical pickup 4 to the optical disc 1 is performed by suitably combining the rough seek of the traverse seek, the small seek of the multi jump and the minute seek of the interval jump.

The reflected light of the laser beam from the information recording surface is received by, for example, a four-divided light receiving element provided in the optical pickup 4. The output signal from the light receiving element is inputted to a front end processor 6. The front end processor 6 includes a focus/tracking detection section 7 to detect focus and tracking errors, and a defect detection section 8 to detect a defect generated by the crack or stain of the optical disc 1. The focus/tracking detection section 7 generates a focus error signal and a tracking error signal based on the output signal from the light receiving element and supplies them to a control section 9. The front end processor 6 synthesizes the inputted output signals from the light receiving element, and generates an RF signal. The RF signal may be directly supplied to the front end processor 6 from the optical pickup 4.

The focus error signal can be generated such that DC components or AC components of the output signals of the light receiving element are added in each of two oblique directions of the four-divided light receiving element, and a difference between both the added signals is taken. The tracking error signal can be generated such that output signals of the light receiving element are added at each of the inner circumferential side and the outer circumferential side of the four-divided light receiving element along the track, and a difference between both the added signals is taken. The defect detection section 8 detects lack of a signal by binarizing the RF signal and by counting using a timing counter. When detecting the lack of a signal, the defect detection section 8 fixes the gain of AGC (Auto Gain Control) in the defect detection section 8.

The control section 9 controls the servo driver 3 so as to attain the focus and tracking based on the focus error signal and the tracking error signal from the focus/tracking detection section 7. The servo driver 3 adjusts the distance between the optical pickup 4 and the information recording surface and the position of the optical pickup 4 in the radius direction so that both the focus error signal and the tracking error signal become 0.

The front end processor 6 supplies the RF signal to the control section 9. The control section 9 performs A/D conversion of the RF signal, performs error correction and modulation processing, and supplies it to an AV decoder 13. Incidentally, the apportionment of signal processing between the front end processor 6 and the control section 9 is not particularly limited, and various signal processings may be performed in the front end processor 6. The AV decoder 13 decodes a video signal and an audio signal based on the input data from the control section 9. The video signal and the audio signal are outputted from an output terminal 14, the video signal is supplied to a not-shown display section and is image-displayed, and the audio signal is supplied to a not-shown speaker and is outputted as audio.

A ROM 10 stores software for executing the optical disc reproducing method of this embodiment. A RAM 11 temporally stores data necessary when the software is operated. An operation section 12 is an operation button provided on the main body of the optical disc reproducing apparatus or a remote controller. Various operations such as reproduce the optical disc 1 (reproduction), stop the reproduction of the optical disc 1 (reproduction stop), see the next chapter (next chapter), and see the previous chapter (previous chapter) are performed by operating the operation section 12.

Figure 2:
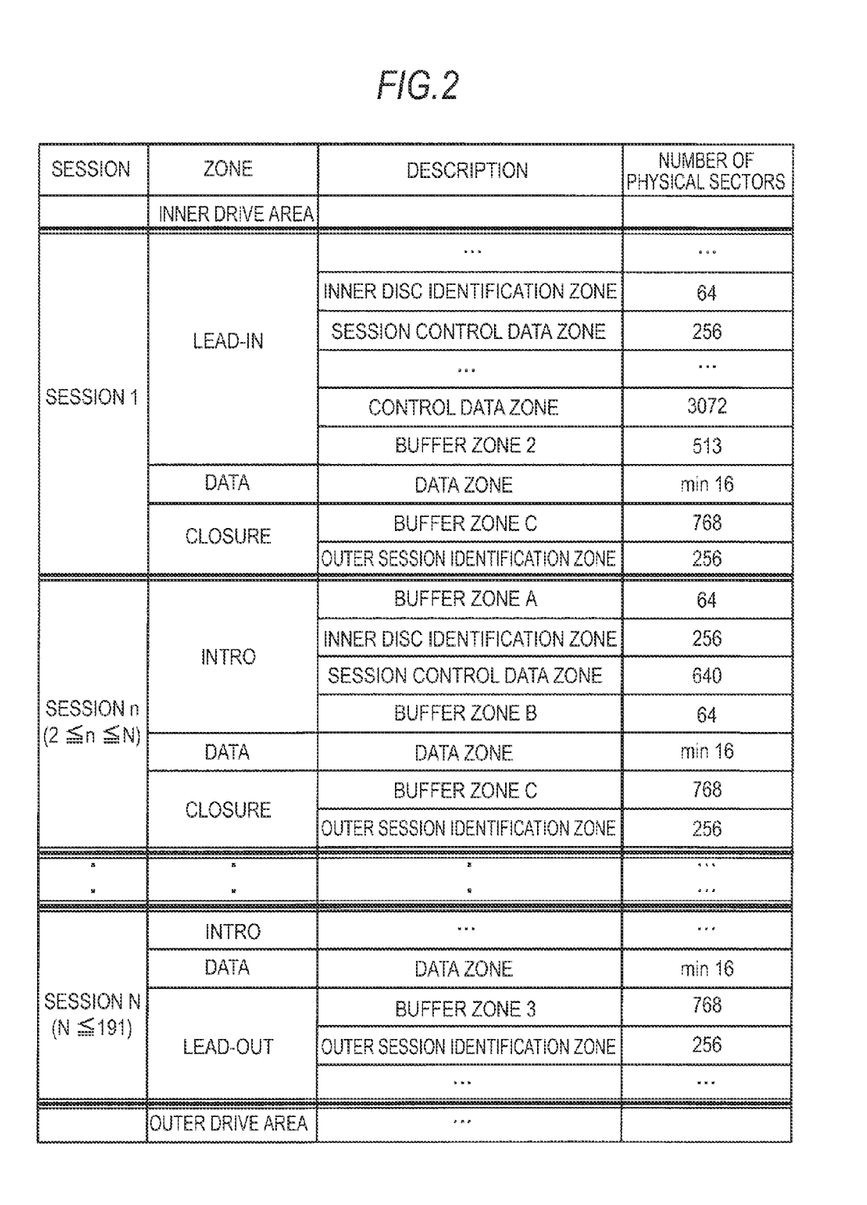
FIG. 2 shows a session structure of a DVD+R.

Here, the session structure of the DVD+R will be described with reference to FIG. 2. The session structure of the DVD+R is defined as shown in FIG. 2. A session number N is 191 or less, and session 1 to session N are arranged from the inner circumferential side of the optical disc 1 to the outer circumferential side. FIG. 2 shows the session structure of the finalized DVD+R. When a session is added to a non-finalized DVD+R, the session in which the outermost circumferential portion is a closure is successively added to the outer circumferential side. When the non-finalized DVD+R is finalized, the closure of a session n (n is not less than 2 and not larger than N) positioned at the outermost circumferential side becomes a lead-out.

Figure 3:
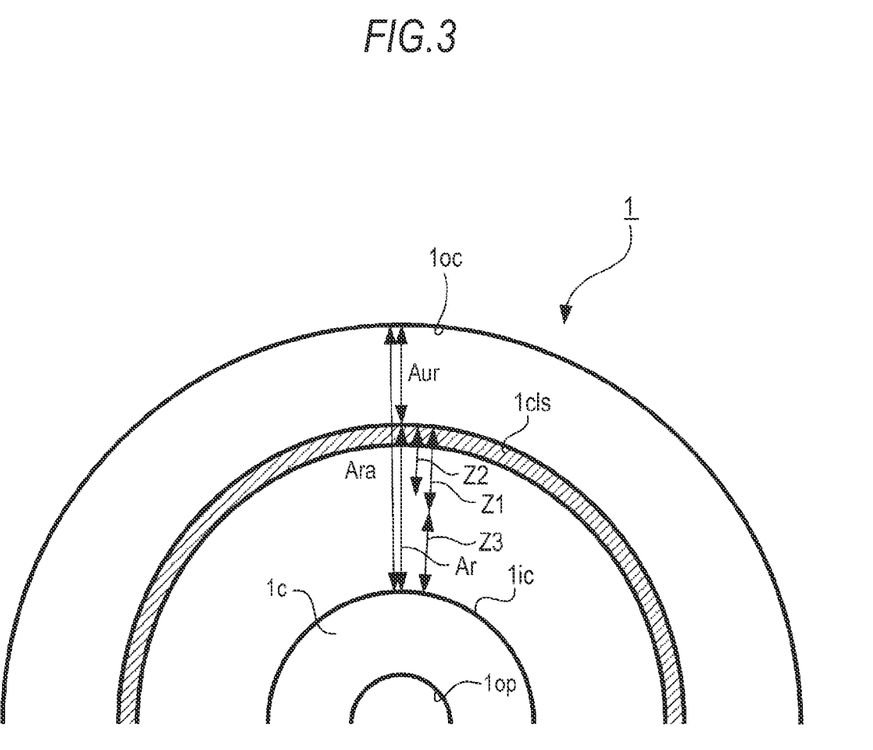
FIG. 3 is an explanatory diagram showing a reproducing method of an optical disc according to the present invention.

FIG. 3 is a plan view schematically showing an approximate half of the optical disc 1, and respective zones used in the optical disc reproducing method of this embodiment will be described. As shown in FIG. 3, a circular opening 1op is provided at the center of the optical disc 1, and the circumference of the opening 1op is a clamp section 1c for clamp the optical disc 1. An area between an innermost circumference 1ic and an outermost circumference 1oc, where recordable tracks are formed, is a recordable area Ara. In the example shown in FIG. 3, an un-recorded area Aur exists on the outer circumferential side of a recorded area Ar, and the outermost circumferential portion of the recorded area Ar is a closure 1cls. For facilitation of understanding, the closure 1cls is hatched.

In this embodiment, a range of a first number of tracks from the outermost circumference of the closer 1cls is set to be an outer circumferential zone Z1, and a range of a second number of tracks is set to be an outer circumferential zone Z2. An inner circumferential side of the outer circumferential zone Z1 is set to be an inner circumferential zone Z3. The first number of tracks of the outer circumferential zone Z1 is, for example, 250, and the second number of tracks of the outer circumferential zone Z2 is, for example, 200. Although it is desirable that the second number of tracks is smaller than the first number of tracks, the second number of tracks may be equal to the first number of tracks, and the second number of tracks has only to be the first number of tracks or less. In this embodiment described using flowcharts of FIG. 4 to FIG. 6, the description will be made on the assumption that the first number of tracks is 250, and the second number of tracks is 200.

Figure 4:
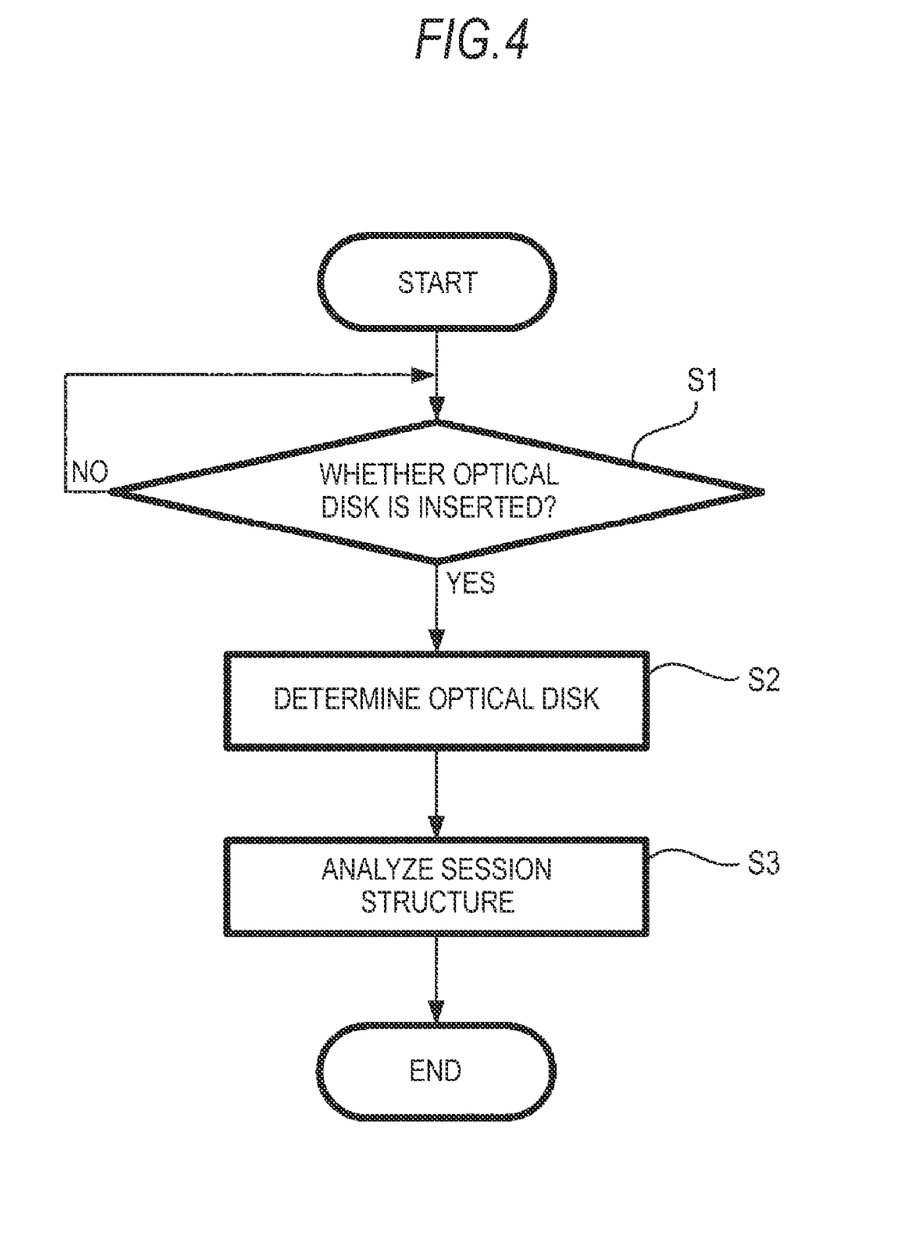
FIG. 4 is a flowchart explaining the embodiment of the optical disc reproducing method of the invention.
Figure 5:
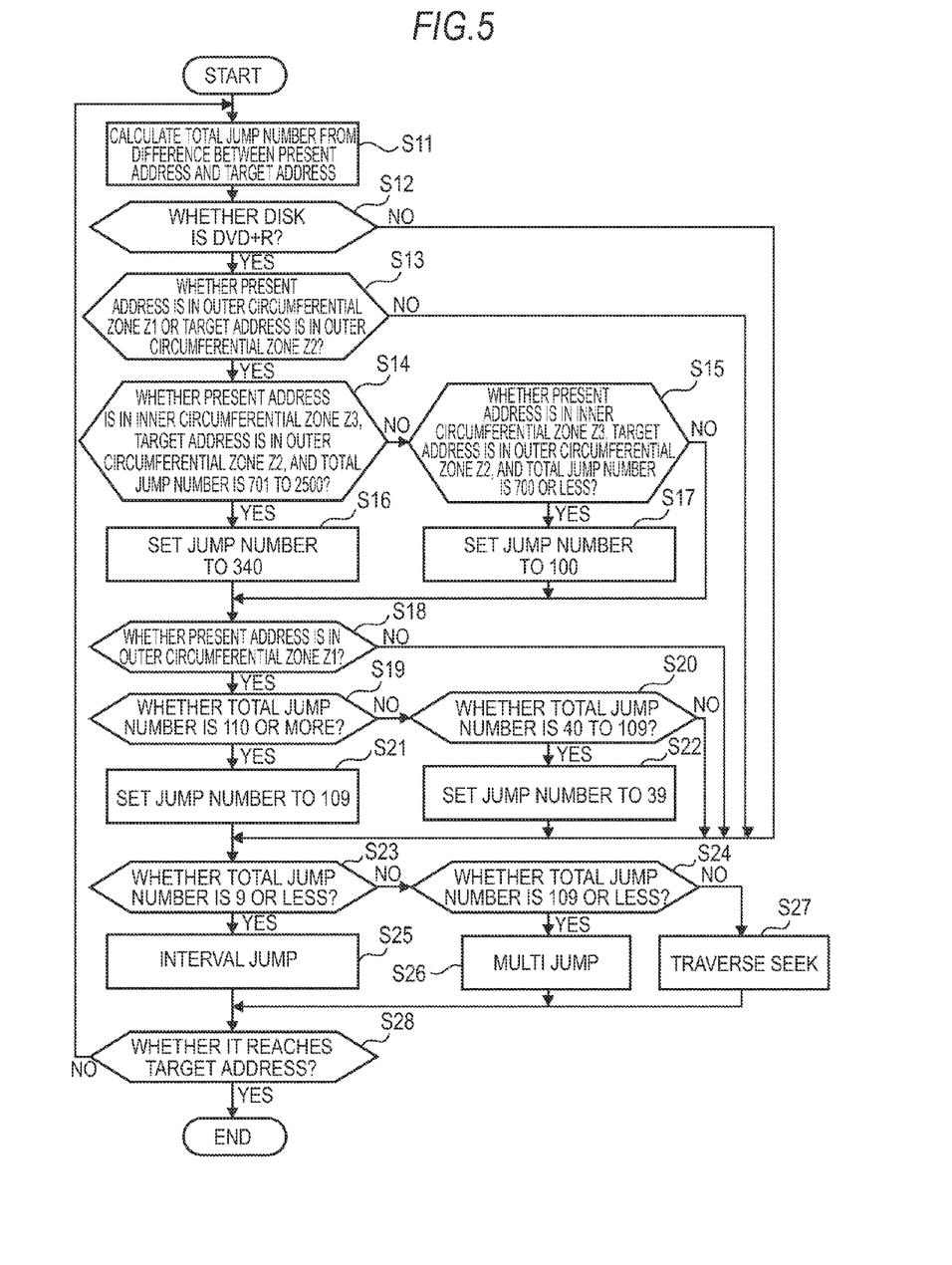
FIG. 5 is a flowchart explaining a seek operation in an outer circumferential direction in the embodiment of the optical disc reproducing method of the invention.
Figure 6:
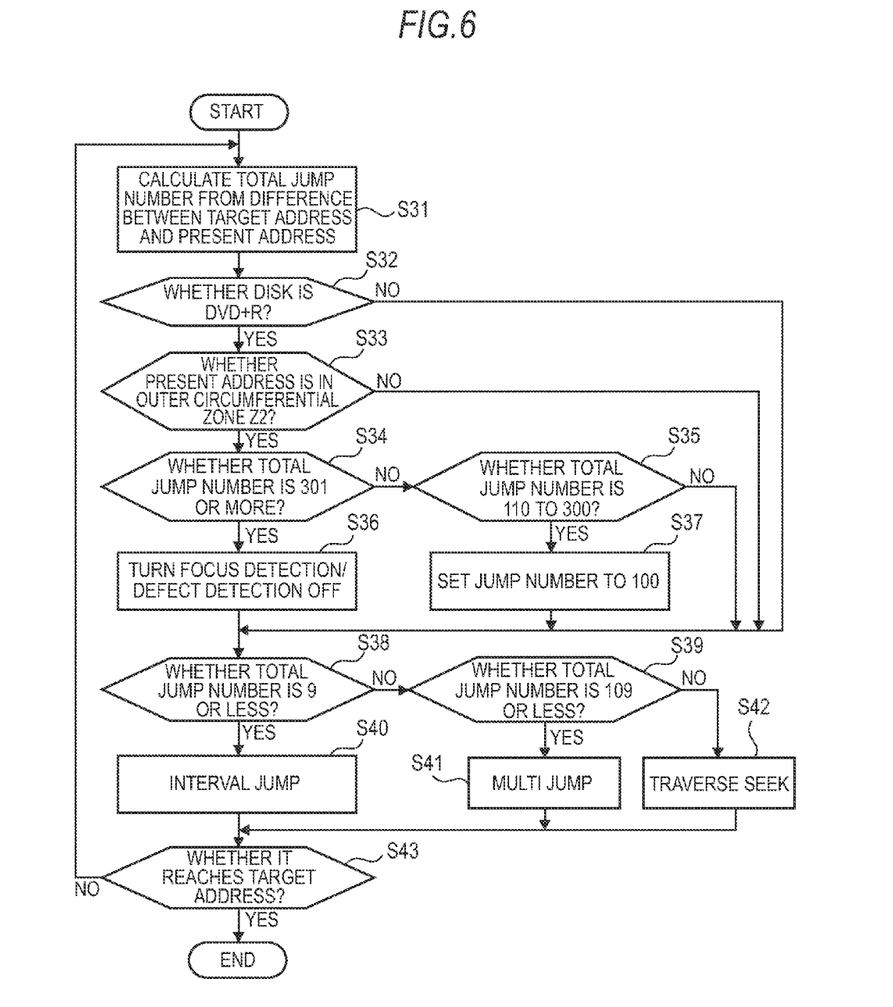
FIG. 6 is a flowchart explaining a seek operation in an inner circumferential direction in the embodiment of the optical disc reproducing method of the invention.

Next, the optical disc reproducing method of this embodiment will be described with reference to the flowcharts of FIG. 4 to FIG. 6. The operation shown in the flowcharts of FIG. 4 to FIG. 6 is performed by the control section 9 based on the software stored in the ROM 10 of FIG. 1. At step S1 of FIG. 4, the control section 9 determines whether the optical disc 1 is inserted. When the optical disc 1 is not inserted, a return is made to step S1, and when the optical disc 1 is inserted, the type of the optical disc 1 is determined at step S2. The determination as to the existence or absence of the optical disc insertion and the determination of the optical disc can be performed by a well-known method. At step S2, the control section 9 determines whether the optical disc 1 is a DVD or a CD, and when determining that it is the DVD, the control section 9 reads data of a control data zone of a lead-in area to determine that it is a DVD+R. The type information of the optical disc 1 determined at step S2 is stored in the RAM 11.

At step S3, the control section 9 controls the servo driver 3 to move the optical pickup 4 from the innermost circumference 1ic in the recordable area Ara of the optical disc 1 to the outermost circumference 1oc, reads the information recorded on the optical disc 1, and analyzes the session structure. The optical disc 1 includes the un-recorded area Aur, and as described in the section of "Description of the Related Art", the laser beam is out of focus in the un-recorded area Aur. However, this out-of-focus occurs only in the initial seek operation when the optical disc 1 is inserted, and when the optical disc reproducing method of this embodiment is executed, it does not occur in an after-described normal reading operation (seek operation) of the optical disc 1.

The session structure analyzed by the initial seek operation shown in FIG. 4 is stored in the RAM 11. The address of the closure 1cls positioned at the outermost circumference of the recorded area Ar is known by this analysis of the session structure. Next, a description will be made on an operation in a case where the optical pickup 4 is moved in the outer circumferential direction or the inner circumferential direction of the optical disc 1 by the operation, such as next chapter or previous chapter, of the operation section 12, and is made to reach a target address.

The operation in the case where the optical pickup 4 is moved in the outer circumferential direction of the disc 1 from the present address and is made to reach the target address will be described. FIG. 5 is a flowchart showing the seek operation in the outer circumferential direction in the optical disc reproducing method of this embodiment. In FIG.

5, at step S11, the control section 9 calculates the total jump number of the optical pickup 4 in the outer circumferential direction from the difference between the present address and the target address. At step S12, the control section 9 determines whether the optical disc 1 is the DVD+R. This determination operation is to read the type information which is determined by the optical disc determination of FIG. 4 and is stored in the RAM 11. When the optical disc 1 is the DVD+R (Yes), the method goes to step S13, and when not the DVD+R (No), the method goes to step S23.

At step S13, the control section 9 determines whether the present address is in the outer circumferential zone Z1 or the target address is in the outer circumferential zone Z2. When the present address is in the outer circumferential zone Z1 and the seek operation is performed toward the outer circumferential side, the optical pickup 4 may exceed the closure 1cls and move onto the un-recorded area Aur. Besides, even if the present address is not in the outer circumferential zone Z1 but in the inner circumferential zone Z3, when the target address is in the outer circumferential zone Z2, when the seek operation is performed into the outer circumferential zone Z2, the optical pickup 4 may exceed the closure 1cls and move onto the un-recorded area Aur. The determination at step S13 is for deciding a movement of the control section 9 from two cases which is a case where there is a high possibility that the optical pickup 4 is moved onto the un-recorded area Aur and a case where there is not a high possibility.

At step S13, when the present address is in the outer circumferential zone Z1 or the target address is in the outer circumferential zone Z2 (Yes), then the method goes to step S14. When the present address is not in the outer circumferential zone Z1 and the target address is not in the outer circumferential zone Z2 (No), then the method goes to step S23. At step S14, the control section 9 determines whether the present address is in the inner circumferential zone Z3, the target address is in the outer circumferential zone Z2, and the total jump number is 701 to 2500. When the three conditions are satisfied (Yes), the method goes to step S16. At step S16, the control section 9 sets the jump number to 340. That is, even if it is determined at step S14 that the total jump number is 701 to 2500, the jump number is fixed to, for example, 340 smaller than 701.

The jump of 340 tracks is performed by the traverse seek as described later, and the traverse seek is the seek performed by the stepping motor 5. Defining strictly, not the number of tracks, but the number of steps of the stepping motor is set. The seek of two steps of the stepping motor 5 is the seek of the jump number of about 340 tracks. An objective of the step S16 is to set the number of steps so that the jump number becomes smaller than 701. In this embodiment, the setting of the jump number when the traverse seek is performed means that the number of steps corresponding to the jump number is set.

When the three conditions are not satisfied at step S14 (No), then the method goes to step S15. At step S15, the control section 9 determines whether the present address is in the inner circumferential zone Z3, the target address is in the outer circumferential zone Z2, and the total jump number is 700 or less. When the three conditions are satisfied (Yes), then the method goes to step S17. At step S17, the control section 9 sets the jump number to 100. That is, when it is determined at step S15 that the total jump number is 700 or less, the jump number is fixed to 100 irrespective of the total jump number. When the three conditions are satisfied at step S15, the jump number actually exceeds 250. Thus, that the jump number is fixed to 100 means that the jump number is set to a number significantly smaller than the actual jump number to the target address.

At steps S16 and S17, when the jump number is set to 340 or 100, then the method goes to step S18. At step S15, when the three conditions are not satisfied (No), the method goes to step S18. At step S18, the control section 9 determines whether the present address is in the outer circumferential zone Z1. When the present address is in the outer circumferential zone Z1 (Yes), the method goes to step S19, and when not in the outer circumferential zone Z1 (No), the method goes to step S23. At step S19, the control section 9 determines whether the total jump number is 110 or more. When the total jump number is 110 or more (Yes), at step S21, the control section 9 sets the jump number to 109. That is, even if it is determined at step S19 that the jump number is 110 or more, the jump number is fixed to 109.

When the control section 9 judges the total jump number is not 110 or more (No) at step S19, the control section 9 determines whether the total jump number is 40 to 109 at step S20. When the total jump number is 40 to 109 (Yes), the method goes to step S22 and the control section 9 sets the jump number to 39. That is, when it is determined that the total jump number is 40 to 109 at step S20, the jump number is fixed to 39. At step 20, when the total jump number is not 40 to 109 (No), the method goes to step S23.

At step S23, the control section 9 determines whether the total jump number is 9 or less. When it is not 9 or less (No), the method goes to step S24, the control section 9 determines whether the total jump number is 109 or less. When the total jump number is 9 or less (Yes) at step S23, the method goes to step S25, and the control section 9 executes the interval jump. At step S24, when the total jump number is 109 or less (Yes), the control section 9 executes the multi jump at step S26. At step S24, when the total jump number is not 109 or less (No), at step S27, the control section 9 executes the traverse seek. At steps S25, S26 and S27, the interval jump, the multi jump and the traverse seek are executed, and then goes to step S28.

At step S28, the control section 9 determines whether the optical pickup 4 reaches the target address, and when the optical pickup 4 does not reach, the method returns to step S11, and the above-described steps are repeated. When it reaches, the procedure is ended.

As is understood from the above description, in the optical disc reproducing method of this embodiment, when it is determined that the optical disc 1 is the DVD+R, and there is relatively high possibility that the optical pickup 4 moves onto the un-recorded area Aur, steps S13 to S22 proceed the seek operation any one of the interval jump, the multi jump and the traverse seek by setting the jump number smaller than the actual jump number from the present address to the target address. Accordingly, the optical pickup 4 does not carelessly move onto the un-recorded area Aur, and can be made to reach the closure 1cls positioned at the outermost circumference of the recorded area Ar.

When the optical disc 1 is not the DVD+R, at step S13, and when it is determined that there is not a high possibility that the optical pickup 4 moves onto the un-recorded area Aur, steps S23 to S27 to execute a normal seek operation is performed without executing steps S13 to S22.

The operation where the optical pickup 4 is moved in the inner circumferential direction of the disc 1 from the present address, and is made to reach the target address is described next. FIG. 6 is a flowchart showing a seek operation in the inner circumferential direction in the optical disc reproducing method of this embodiment. In FIG. 6, at step S31, the control section 9 calculates the total jump number of the optical pickup 4 in the inner circumferential direction from the difference between the present address and the target address. At step S32, the control section 9 determines whether the optical disc 1 is the DVD+R. This determination operation is the same as that of step S12 of FIG. 5. When the optical disc 1 is the DVD+R (Yes), the method goes to step S33, and when it is not the DVD+R (No), the method goes to step S38.

At step S33, the control section 9 determines whether the present address is in the outer circumferential zone Z2. When the present address is in the outer circumferential zone Z2 (Yes), the method goes to step S39, and when it is not in the outer circumferential zone Z2 (No), the method goes to step S38. At step S34, the control section 9 determines whether the total jump number is 301 or more. When the total jump number is 301 or more (Yes), at step S36, the control section 9 turns off focus detection performed by the focus/tracking detection section 7 and defect detection performed by the defect detection section 8. The reason why the focus detection and the defect detection are turned off is to prevent an out-of-focus state from occurring even if the optical pickup 4 moves onto the un-recorded area Aur. When it is determined that the total jump number is not 301 or more (No) in the step S34, then the method goes to step S35.

At step S35, the control section 9 determines whether the total jump number is 110 to 300. When the total jump number is 110 to 300 (Yes), at step S37, the control section 9 sets the jump number to 100. That is, when it is determined that the total jump number is 110 to 300 in step S35, the control section 9 fixes the jump number to, for example, 100 smaller than 110.

At step S38, the control section 9 determines whether the total jump number is 9 or less, and when it is not 9 or less (No), at step S39, the control section 9 determines whether the total jump number is 109 or less. When it is determined that the total jump number is 9 or less (Yes) in step S38, at step S40, the control section 9 executes the interval jump. At step S39, when the total jump number is 109 or less (Yes), at step S41, the control section 9 executes the multi jump. At step S39, when the total jump number is not 109 or less (No), at step S42, the control section 9 executes the traverse seek. At steps S40, S41 and S42, the interval jump, the multi jump and the traverse seek are executed, and then, the method goes to step S43.

At step S43, the control section 9 determines whether the optical pickup 4 reaches the target address, and when it does not reach, the method returns to step S31, and the above-described steps are repeated. When it reaches, the procedure is ended.

The reason why the focus detection and the defect detection are turned off at step S36, and the jump number is set to be smaller than the total jump number at step S37 is described below. In the case of the seek operation in the inner circumferential direction, the possibility that the optical pickup 4 moves onto the un-recorded area Aur is lower than that in the case of the seek operation in the outer circumferential direction of FIG. 5. However, when the present address is in the outer circumferential zone Z2, there is a possibility that the optical pickup 4 moves onto the un-recorded area Aur by vibration of the optical pickup 4 when the optical pickup 4 starts to move.

Then, when a relatively large jump such as the total jump number is, for example, 301 or more, is performed the traverse seek is performed in the state of turning off the focus detection and the defect detection. Besides, when the total jump number is 110 to 300, the jump number is set to, for example, 100 so that the multi jump, not the traverse seek, is performed. Incidentally, when the total jump number is 301 or more, instead of decreasing the jump number to perform the multi jump, the traverse seek is performed for the purpose of shortening the seek time.

The optical disc reproducing method of the embodiment described above is summarized as follows. First, the seek operation in the outer circumferential direction will be described. When the seek operation is performed from the present address on optical disc 1 which is the un-finalized DVD+R standard optical disc to the target address positioned on the outer circumferential side of the present address, a total jump number of tracks in the outer circumferential direction (herein after the outer circumferential direction total jump number) is calculated from the difference between the present address and the target address (step S11 of FIG. 5).

It is determined whether the present address is in the first outer circumferential zone Z1 of the first number of tracks from the closure 1*cls* positioned at the outermost circumference of the recorded area Ar of the optical disc 1, or whether the present address is in the inner circumferential zone Z3 on the inner circumferential side of the first outer circumferential zone Z1 (steps S13 and S14 of FIG. 5). Besides, it is determined whether the target address is in the second outer circumferential zone Z2 of the second number of tracks from the closure 1*cls* (step S13 of FIG. 5).

When a first condition is satisfied in which the present address is in the inner circumferential zone Z3, the target address is in the second outer circumferential zone Z2, and the outer circumferential direction total jump number is between the first number (701 in the example of FIG. 5) and the second number (2500 in the example of FIG. 5) larger than the first number, the jump number of tracks is set to a third number (340 in the example of FIG. 5) smaller than the first number, and the traverse seek using the moving mechanism to move the optical pickup 4 in the radius direction by the third number is performed (steps S14, S16 and S27 of FIG. 5).

When a second condition is satisfied in which the present address is in the inner circumferential zone Z3, the target address is in the second outer circumferential zone Z2, and the outer circumferential direction total jump number is smaller than the first number, the jump number of tracks is set to a fourth number (100 in the example of FIG. 5) smaller than the third number, and the multi jump is performed in which the irradiation position of the laser beam from the optical pickup 4 is moved in the radius direction by the fourth number in the state where the position of the optical pickup 4 determined by the moving mechanism is fixed (steps S15, S17 and S26 of FIG. 5).

When the first and the second conditions are not satisfied, but a third condition is satisfied in which the present address is in the first outer circumferential zone Z1, and the outer circumferential direction total jump number is a fifth number (110 in the example of FIG. 5) larger than the fourth number, the jump number of tracks is set to a sixth number (109 in the example of FIG. 5) smaller than the fifth number, and the multi jump is performed by the sixth number (steps S18, S19, S21 and S26 of FIG. 5).

When the first and the second conditions are not satisfied, but a fourth condition is satisfied in which the present address is in the first outer circumferential zone Z1, and the outer circumferential direction total jump number is between a seventh number (40 in the example of FIG. 5) smaller than the fifth number and an eighth number (109 in the example of FIG. 5) smaller than the fifth number and larger than the seventh number, the jump number of tracks is set to a ninth number (39 in the example of FIG. 5) smaller than the seventh number, and the multi jump is performed by the ninth number (steps S20, S22 and S26 of FIG. 5).

When a fifth condition is satisfied in which the present address is not in the first outer circumferential zone Z1 or the target address is not in the second outer circumferential zone Z2, the traverse seek, the multi jump and the interval jump in which the position of the optical pickup 4 determined by the moving mechanism is fixed and the irradiation position of the laser beam from the optical pickup is moved one track by one track are selectively performed according to the outer circumferential direction total jump number (steps S23 to S27 of FIG. 5).

As described above, although the first number of tracks of the first outer circumferential zone Z1 and the second number of tracks of the second outer circumferential zone Z2 may be equal to each other, it is desirable that the second number of tracks is smaller than the first number of tracks.

Next, the seek operation in the inner circumferential direction will be described. When the seek operation is performed from the present address on the optical disc 1 to the target address positioned on the inner circumferential side of the present address, the inner circumferential direction total jump number of tracks is calculated from the difference between the present address and the target address (step S31 of FIG. 6). It is determined whether the present address is in the second outer circumferential zone Z2 (step S33 of FIG. 6).

When a sixth condition is satisfied in which the present address is in the second outer circumferential zone Z2 and the inner circumferential direction total jump number is a tenth number (301 in the example of FIG. 6) or more, the traverse seek is performed in the state where the focus detection and the defect detection are turned off (steps S34, S36 and S42 of FIG. 6).

When a seventh condition is satisfied in which the present address is in the second outer circumferential zone Z2, and the inner circumferential direction total jump number is between an eleventh number (110 in the example of FIG. 6) smaller than the tenth number and a twelfth number (300 in the example of FIG. 6) smaller than the tenth number and larger than the eleventh number, the jump number is set to a thirteenth number (100 in the example of FIG. 6) smaller than the eleventh number, and the multi jump is performed by the thirteenth number (steps S35, S37 and S41 of FIG. 6).

When an eighth condition is satisfied in which the present address is not in the second outer circumferential zone Z2, the traverse seek, the multi jump and the interval jump are selectively performed according to the inner circumferential direction total jump number (steps S38 to S42 of FIG. 6).

The optical disc reproducing method of this embodiment is such a simple method that the seek operation is not performed only by the outer circumferential direction total jump number or the inner circumferential direction total jump number, but the jump number is suitably decreased according to the total jump number, and the traverse seek, the multi jump and the interval jump are selectively used. Accordingly, when the method is mounted in an existing optical disc reproducing apparatus, the cost is hardly increased. Since the data of the ICB in the closure can be read, the non-finalized DVD+R can be reproduced.

The present invention is not limited to the embodiment described above, but can be variously modified within the scope of the invention. For example, the respective jump numbers in FIG. 5 and FIG. 6 are merely exemplary, and the jump numbers are not limited to those shown in FIG. 5 and FIG. 6. Besides, the invention is not limited to the execution of all the steps of FIG. 5 and FIG. 6.

What is claimed is:

1. A method for reproducing an optical disc comprising:
calculating an outer circumferential direction total jump number of tracks from a difference between a present address and a target address when a seek operation is performed from the present address on a non-finalized DVD+R standard optical disc to the target address positioned on an outer circumferential side of the present address;
determining whether the present address is in a first outer circumferential zone of a first number of tracks from a closure positioned at an outermost circumference of a recorded area of the optical disc or whether the present address is in an inner circumferential zone on an inner circumferential side of the first outer circumferential zone;
determining whether the target address is in a second outer circumferential zone of a second number of tracks from the closure;
setting a jump number of tracks to a third number smaller than the outer circumferential direction total jump number when a first condition is satisfied in which the present address is in the inner circumferential zone, the target address is in the second outer circumferential zone, and the outer circumferential direction total jump number is between a first number and a second number larger than the first number, and performing a traverse seek using a moving mechanism to move an optical pickup in a radius direction by the third number,
wherein when a second condition is satisfied in which the present address is in the inner circumferential zone, the target address is in the second outer circumferential zone, and the outer circumferential direction total jump number is smaller than the first number, the jump number of tracks is set to a fourth number smaller than the third number, and a multi jump is performed in which an irradiation position of a laser beam from the optical pickup is moved in the radius direction by the fourth number in a state where a position of the optical pickup determined by the moving mechanism is fixed.

2. The method according to claim 1, wherein when the first and the second conditions are not satisfied, but a third condition is satisfied in which the present address is in the first outer circumferential zone, and the outer circumferential direction total jump number is not smaller than a fifth number larger than the fourth number, the jump number of tracks is set to a sixth number smaller than the fifth number, and the multi jump is performed by the sixth number.

3. The method according to claim 2, wherein when the first and the second conditions are not satisfied, but a fourth condition is satisfied in which the present address is in the first outer circumferential zone, and the outer circumferential direction total jump number is between a seventh number smaller than the fifth number and an eighth number smaller than the fifth number and larger than the seventh number, the jump number of tracks is set to a ninth number smaller than the seventh number, and the multi jump is performed by the ninth number.

4. A method for reproducing an optical disc comprising:
calculating an outer circumferential direction total jump number of tracks from a difference between a present address and a target address when a seek operation is performed from the present address on a non-finalized DVD+R standard optical disc to the target address positioned on an outer circumferential side of the present address;
determining whether the present address is in a first outer circumferential zone of a first number of tracks from a closure positioned at an outermost circumference of a recorded area of the optical disc or whether the present address is in an inner circumferential zone on an inner circumferential side of the first outer circumferential zone;

determining whether the target address is in a second outer circumferential zone of a second number of tracks from the closure;

setting a jump number of tracks to a third number smaller than the outer circumferential direction total jump number when a first condition is satisfied in which the present address is in the inner circumferential zone, the target address is in the second outer circumferential zone, and the outer circumferential direction total jump number is between a first number and a second number larger than the first number, and performing a traverse seek using a moving mechanism to move an optical pickup in a radius direction by the third number, wherein when a fifth condition is satisfied in which the present address is not in the first outer circumferential zone or the target address is not in the second outer circumferential zone, the traverse seek, the multi jump and an interval jump in which the position of the optical pickup determined by the moving mechanism is fixed, and an irradiation position of a laser beam from the optical pickup is moved one track by one track are selectively performed according to the outer circumferential direction total jump number.

5. A method for reproducing an optical disc comprising:

calculating an outer circumferential direction total jump number of tracks from a difference between a present address and a target address when a seek operation is performed from the present address on a non-finalized DVD+R standard optical disc to the target address positioned on an outer circumferential side of the present address;

determining whether the present address is in a first outer circumferential zone of a first number of tracks from a closure positioned at an outermost circumference of a recorded area of the optical disc or whether the present address is in an inner circumferential zone on an inner circumferential side of the first outer circumferential zone;

determining whether the target address is in a second outer circumferential zone of a second number of tracks from the closure;

setting a jump number of tracks to a third number smaller than the outer circumferential direction total jump number when a first condition is satisfied in which the present address is in the inner circumferential zone, the target address is in the second outer circumferential zone, and the outer circumferential direction total jump number is between a first number and a second number larger than the first number, and performing a traverse seek using a moving mechanism to move an optical pickup in a radius direction by the third number, wherein the first number of tracks of the first outer circumferential zone and the second number of tracks of the second outer circumferential zone are equal to each other.

6. A method for reproducing an optical disc comprising:

calculating an outer circumferential direction total jump number of tracks from a difference between a present address and a target address when a seek operation is performed from the present address on a non-finalized DVD+R standard optical disc to the target address positioned on an outer circumferential side of the present address;

determining whether the present address is in a first outer circumferential zone of a first number of tracks from a closure positioned at an outermost circumference of a recorded area of the optical disc or whether the present address is in an inner circumferential zone on an inner circumferential side of the first outer circumferential zone;

determining whether the target address is in a second outer circumferential zone of a second number of tracks from the closure;

setting a jump number of tracks to a third number smaller than the outer circumferential direction total jump number when a first condition is satisfied in which the present address is in the inner circumferential zone, the target address is in the second outer circumferential zone, and the outer circumferential direction total jump number is between a first number and a second number larger than the first number, and performing a traverse seek using a moving mechanism to move an optical pickup in a radius direction by the third number, wherein the second number of tracks of the second outer circumferential zone is smaller than the first number of tracks of the first outer circumferential zone.

7. A method for reproducing an optical disc comprising:

calculating an outer circumferential direction total jump number of tracks from a difference between a present address and a target address when a seek operation is performed from the present address on a non-finalized DVD+R standard optical disc to the target address positioned on an outer circumferential side of the present address;

determining whether the present address is in a first outer circumferential zone of a first number of tracks from a closure positioned at an outermost circumference of a recorded area of the optical disc or whether the present address is in an inner circumferential zone on an inner circumferential side of the first outer circumferential zone;

determining whether the target address is in a second outer circumferential zone of a second number of tracks from the closure;

setting a jump number of tracks to a third number smaller than the outer circumferential direction total jump number when a first condition is satisfied in which the present address is in the inner circumferential zone, the target address is in the second outer circumferential zone, and the outer circumferential direction total jump number is between a first number and a second number larger than the first number, and performing a traverse seek using a moving mechanism to move an optical pickup in a radius direction by the third number, further comprising calculating an inner circumferential direction total jump number of tracks from a difference between the present address and the target address when the seek operation is performed from the present address on the optical disc to the target address positioned on the inner circumferential side of the present address, determining whether the present address is in the second outer circumferential zone, and when a sixth condition is satisfied in which the present address is in the second outer circumferential zone and the inner circumferential direction total jump number is a tenth number or more, performing the traverse seek in a state where focus detection and defect detection are turned off.

8. The method according to claim 7, wherein when a seventh condition is satisfied in which the present address is in the second outer circumferential zone, and the inner circumferential direction total jump number is between an eleventh number smaller than the tenth number and a twelfth number smaller than the tenth number and larger than the eleventh number, the jump number is set to a thirteenth number smaller than the eleventh number, and the multi jump is performed by the thirteenth number.

9. The method according to claim 8, wherein when an eighth condition is satisfied in which the present address is not in the second outer circumferential zone, the traverse seek, the multi jump and the interval jump are selectively performed according to the inner circumferential direction total jump number.

* * * * *